[11] 3,577,981

| [72] | Inventor | Arthur Kuris |
| | | Riverdale, N.Y. |
| [21] | Appl. No. | 736,761 |
| [22] | Filed | June 13, 1968 |
| [45] | Patented | May 11, 1971 |
| [73] | Assignee | Ultrasonic Systems, Inc. |
| | | Plainview, N.Y. |

[54] ULTRASONIC METHOD FOR DETECTING THE ACCUMULATION OF CHOLESTEROL AND OTHER DEPOSITS IN BLOOD VESSELS AND THE LIKE
21 Claims, 7 Drawing Figs.

[52] U.S. Cl. .................................................. 128/2R, 73/67.2, 128/24A
[51] Int. Cl. .................................................. A61b 6/12
[50] Field of Search ........................................... 128/2, 24.05, 305, 303.14; 73/67, 67.2, 69

[56] References Cited
UNITED STATES PATENTS

| 3,182,489 | 5/1965 | Hamilton...................... | 73/67 |
| 3,191,430 | 6/1965 | Gourley........................ | 73/67 |
| 3,192,516 | 6/1965 | Simpkins et al............... | 73/67.2UX |
| 3,264,864 | 8/1966 | Reid et al...................... | 73/69 |
| 3,346,065 | 10/1967 | Bourquard .................. | 73/69X |

OTHER REFERENCES
HEWLETT-PACKARD JOURNAL, May 1967, pp. 1— 10, (copy in GR 280, 73/67)

*Primary Examiner*—Richard A. Gaudet
*Assistant Examiner*—Kyle L. Howell
*Attorney*—Leonard W. Suroff ABSTRACT: The invention relates to medical diagnosis by detecting the ultrasonic sounds that are present in humans and normally inaudible to the human ear and converting same into audible sounds for meaningful diagnostic information. In particular the invention relates to the detection of accumulated foreign deposits of material in vessels of living human beings, such as cholesterol in blood vessels, without causing any disruption or damage to the surrounding walls of the vessels, by detecting the ultrasonic vibrations as the blood flows therethrough and converting same to audible sound. The invention also relates to the introduction of ultrasonic energy waves into the body with the resultant creation of additional inaudible wave energy at a different frequency and then translating same into audible sound which the trained ear can diagnose.

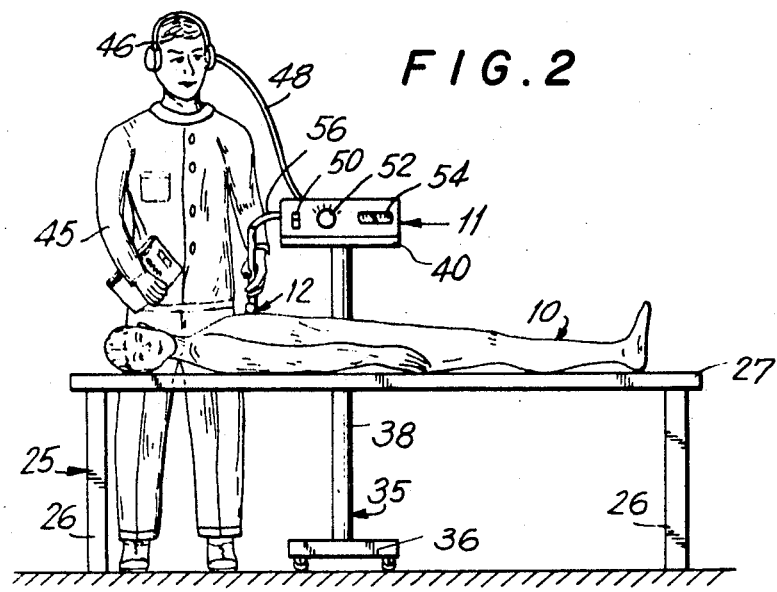
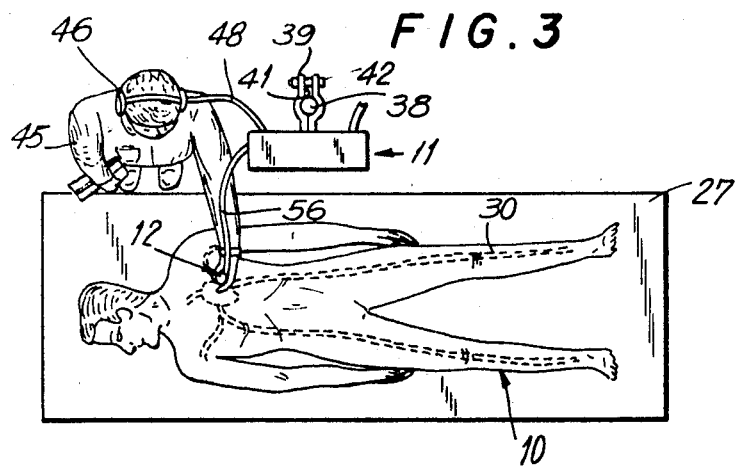
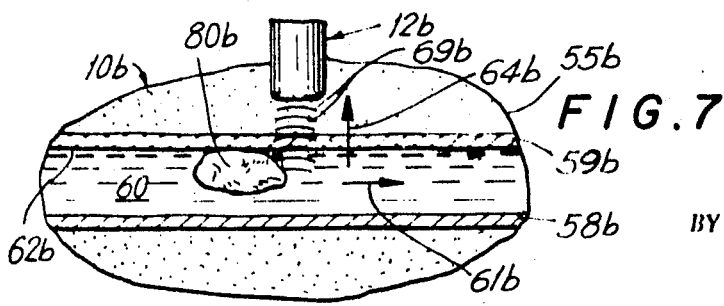

INVENTOR.
ARTHUR KURIS

BY

Leonard W. Suroff
ATTORNEY

ULTRASONIC METHOD FOR DETECTING THE ACCUMULATION OF CHOLESTEROL AND OTHER DEPOSITS IN BLOOD VESSELS AND THE LIKE

CROSS-REFERENCE TO RELATED APPLICATION

In my copending application Ser. No. 736,653, filed on June 13, 1968, and which entire subject matter of the copending application is incorporated herein by reference as if fully set forth herein, I disclose one means of removing foreign material, such as cholesterol found in the circulatory system after using the method and apparatus of the present invention for detecting the buildup thereof.

BACKGROUND OF THE INVENTION

This invention relates generally to improvements in analyzing the condition of biological organisms by converting the ultrasonic energy waves present in the body to audible sounds and more particularly to methods and apparatus for determining by the use of ultrasonic energy certain characteristics and inherent properties of human organs or associated parts thereof.

The outstanding and unexpected results obtained by the practice of the method and apparatus of the present invention, are attained by a series of features, steps and elements, working together in interrelated combination, and may be applied to biological organisms such as humans for detecting the medical condition thereof in general and particularly the vascular system of humans, and hence will be so illustrated and described.

Heretofore it has been well known that various systems of the human body emit energy waves in the low sonic frequency range, such as the heart which beats in the range of 60 to 80 cycles per minute, and which energy is audibly detectable and used for diagnostic purposes. I have now discovered that the human body also creates ultrasonic vibrations in various body systems, which vibrations have been undetectable to date, and therefore possible diagnostic treatment has remained untapped with the result that early detection of certain inherent malfunctions have gone unnoticed. I have now also discovered that it is possible to transform this "silent sound" into an audible frequency and so that it may be utilized for diagnostic purposes by the medical profession to aid humanity.

Before proceeding to the details of the invention, first let us review briefly generally known facts of the human body and the various integrated systems, such as the circulatory, nervous, respiratory and others, which have generally associated therewith certain movements that produce sounds in various frequency ranges, that to date, in certain instances, are detectable by the human ear with the aid of a stethoscope normally used by physicians. Some of these body systems produce, due to the movement of the integrated parts, sounds that are not detectable with conventional instruments, but still sounds are emitted therefrom and which sounds in accordance with the present invention may be detected and translated into meaningful information such that the surgeon or other skilled operator might utilize this information to properly diagnose the condition of the patient. Thus, the body internally produces sound at various frequencies of vibration that exist both in the low sonic range, audible to the human ear and easily detectable, and those in the ultrasonic frequency range. By way of example, it is known that the heart beat has a frequency pattern that is easily audible to the ear of the human without any major instrumentation. On the other hand, the atoms and molecules of the human body are in constant vibratory motion in the gigacycle range and to date the sounds emitted have been undetectable. The energy spectrum that this invention deals with is primarily related to ultrasonic sound emitted by macrostructures of the human body, such as the various organs and the parts of the skeletal structure, which in many instances exhibit natural frequencies and in turn ultrasonic vibrations that to date have remained undetectable for diagnostic purposes. By way of example, the blood rushing through the vessels creates ultrasonic vibrations that can be detected and diagnosed in accordance with the present invention.

The present invention should not be confused with presently commercial existing equipment, as for example, illustrated in U.S. Pat. No. 3,323,512, that deals with use of pulse-echo ultrasonic instrumentation wherein echo-pulses occurring in a relatively short repetition rate are sampled to produce a reconstructed echo-waveform which may be recorded at relatively slow speed. This prior art equipment relies on the technique which is comparable to nondestructive testing wherein a beam of ultrasonic pulses is projected in the direction to be viewed, and the measurement beam based on the amount of time it takes for an echo-pulse to return from a reflecting object or target within the internal structure.

In contrast to the above, the present invention utilizes the natural vibratory energy contained in the human body and its natural frequencies of vibration which are in the ultrasonic range to begin with and thereby, to date, have been inaudible to the human ear.

CIRCULATORY SYSTEM

One aspect under consideration in the present invention, is the use of mechanical vibrations in the sonic and ultrasonic ranges for detecting the buildup of foreign deposits and change in physical structure in the vascular system without damaging the surrounding tissue in the process, and since this application finds ideal utilization of the present invention it is hereinafter disclosed in detail. In my copending patent application, referred to above, the basic invention of removing cholesterol or other deposits from blood vessels is disclosed.

The circulatory system has been likened to a river with the stream of blood driven by the heart. As the heart contracts forcefully, it exerts a strong pressure on the blood it contains, which is therefore squirted energetically into the arteries. The arteries have elastic walls which bulge outward under the force of the blood pulsing through and contract again once the blood current has surged past. This is the pulse that can be felt wherever an artery approaches close to the skin, notably on the inner surface of the wrist. The expansion and contraction of the artery mirrors the expansion and contraction of the heart. The rapidity and strength of the pulse can give information to the trained observer. The blood pressure provides energy waves which due to the closeness of certain arteries to the skin certain information is obtainable. A portion of the pressure is consumed in overcoming the friction of the blood stream against the walls of the blood vessel. The amount of friction depends upon the viscosity of the blood. The more viscous, the more slowly and sluggishly will any liquid flow.

The heart every minute moves a little better than a gallon of blood (the body's whole volume is 6 quarts) along miles of blood vessels ranging from the thumb-thick aorta to the ultra microscopic capillaries which link the tiny arterioles and venules. That gallon-plus is the heart's "resting" volume and is constantly multiplied, almost instantly, to service the body for various levels of work up to perhaps 40 gallons per minute for the top exertion of a trained athlete. In a normal male this means moving nearly a million gallons a year over the intricate 60,000 mile canal system of the circulation. It is like a canal because the arteries are serviced by thousands of traffic controlling sluice gates and the veins are serviced with valves, like canal locks. The blood vessels are not inert tubes but dynamic organs themselves. Arteries are made up of tough outer layer of connective tissue, a middle layer called the media (which combines muscle and elastic tissue) and a thin shining lining called the intima. A hardening of the media can restrict the arteries and push blood pressure up. But it is the fat-scarring of the intima-atherosclerosis and the blood-stopping clots which the scarring may lead to which are by far and away the major heart disease villains.

A human being begins life quite literally with a pure heart, but cholesterol and other substances not yet fully understood can begin to coat the inner layer of blood vessels. Once this coating process begins, the artery's normally smooth inner surface roughens and buckles. Its natural elasticity gradually disappears, and it no longer helps move blood into the body. The pressure needed to force blood through these narrowing corridors slowly rises. Overworked, the heart becomes a candidate for cardiac trouble. Laboring to sustain life under the accumulation of fatty deposits contained in the arteries, the muscles of the heart thicken and lose their precious elasticity.

The cholesterol is usually deposited in the arteries, and this is perhaps because there the blood stream is at its swiftest and cholesterol is most easily torn off its carrier. Once cholesterol begins clogging up the inner surface of an artery, it narrows the bore and thus increases the blood pressure at that point. Furthermore, it reduces the elasticity of the arterial wall so that there is increased danger of a break under the additional stress. Furthermore, the internal surface becomes rough and ragged, offering opportunities for blood clots to form and perhaps block off a particular vessel entirely. This last is called thrombosis. When thrombosis occurs in the coronary arteries that feed the heart, the result is what is commonly known as "heart attack." The condition of cholesterol settling out on the inner walls of the arteries is known as atherosclerosis. Now that infectious diseases have been brought under such good control by means of vaccination, community hygiene and antibiotics, atherosclerosis has become the number one killer of mankind in the western world.

I have now found that as the accumulation of material becomes deposited on the inner wall surface of the blood vessel, that there is a detectable change in the ultrasonic vibrations produced as the blood flows through these constricted areas, which in accordance with the present invention these sounds are readily detectable by a skilled operator with knowledge of the circulatory system. The ability to pinpoint such a restriction or accumulation of material permits the operating team to determine to what extent the vessel has deteriorated or to what degree the elasticity of the inner walls of the arteries or veins have tended to become rough and ragged which offers opportunities for blood clots to form and perhaps block off a particular vessel entirely. The detection process in accordance with the present invention permits the detection of blood clots since this too presents in a sense a changing cross-sectional area and audible sounds are obtained so that diagnostic treatment is permitted. In addition the heart itself may be diagnosed for purposes of detecting malfunctions not discernible with the conventional stethoscope.

OBJECTIVES OF THE INVENTION

An object of the present invention is to provide an improved method for detecting the various changing characteristics of human organs by external procedures.

Another object of the present invention is to provide an improved method to analyze the various systems of the body that have heretofore been of the type where audible sound was not detectable therefrom.

Another object of the present invention is to provide a method of transforming the inaudible sound in the ultrasonic frequency range to audible sound for use by the skilled physician in determining the status of various organisms.

Another object of the present invention is to provide an improved method for detecting the accumulation of deposits on the wall surfaces of the vascular system in vivo of a human with ultrasonic energy.

Another object of the present invention is to provide an improved method for determining the blockages in the vascular system as in arteries and veins which have reached an unsafe limit.

Another object of the present invention is to provide an ultrasonic method of harmonically tapping, by introducing energy waves to a selected portion of the human and thereafter reading out the secondary ultrasonic waves set up by the introduction of the introduced ultrasonic energy.

Another object of the present invention is to provide an ultrasonic method of introducing vibratory energy in the ultrasonic frequency range and of filtering out the resultant energy waves to obtain the desired audible sound.

Another object of the present invention is to provide a method for determining the flaws in the skeleton system of the human by detecting changes in transmission of energy waves therethrough by the reading out of same in the form of audible sound.

Other objects and advantages of this invention will become apparent as the disclosure proceeds.

SUMMARY OF THE INVENTION

The outstanding and unexpected results obtained by the practice of the method and apparatus of this invention are obtained by a series of features, steps and elements assembled and working together in interrelated combination. Briefly, I have now discovered that the heretofore inaudible sounds of the various organic structures or systems of the human does provide sound in the ultrasonic frequency range and that it is possible to selectively transform these sounds into a frequency range that is audible to the human ear, whereby a skilled technician can detect the particular properties and in turn diagnose the condition of the portion of the human organism under consideration.

It has been found that the motion of the fluids and the expanding and contracting of organs throughout the body tend to create energy patterns that are in the inaudible frequency range for the human ear, and that this energy in the ultrasonic frequency range can be selectively translated into audible sound for diagnostic purposes. The skilled diagnostician is then capable after numerous cases of determining the particular degree or status of the system under consideration, to properly diagnose the patient.

An ideal example, which is herein illustrated, is the vascular system which as the blood rushes therethrough creates ultrasonic vibration that are normally inaudible and have to date been undetectable. Accordingly a degree of foreign deposit accumulation on the inner wall thereof, such as cholesterol, has gone undetected although it is well known that sufficient deposits can cause fatal heart attacks to individuals.

Thus, in accordance with the present invention electronic instrumentation which may consist of a hand held probe microphone can be coupled to various portions of the human and the hand held probe responds only to ultrasonic energy in the range generally from 10,000 to 200,000 cycles per second, such as by energy released during the movement of the blood through the various vessels. The electronic equipment translates and amplifies this faint ultrasonic energy into the audible range for the units loud speaker or earphones which are worn by the operator, while maintaining sound characteristics. Thus, a skilled surgeon or technician operating the device actually extends his hearing to the range where he can detect various changes in functioning organs without ever actually visibly analyzing the organ.

In accordance with one aspect of the invention the patient is brought into contact with an ultrasonic probe and the surgeon can, knowing the location of the various blood vessels, progressively move the probe along the path of these vessels and by the audible sound, in a manner like the stethoscope, detect those areas where due to either a blood clot, or other substantial cross-sectional change, due to the sound now beamed audible, locate and determine the severity of the medical condition. The doctor then determines what proper medical steps may be taken for the patient and for example either drugs may be injected into the blood stream to properly assist the patient or as previously discussed, operations are feasible in which the material is removed internally. Thus, it can be seen that the skilled doctor once knowing the various sounds after being exposed thereto, can easily detect when a particular system under consideration is malfunctioning.

In accordance with another embodiment of the invention we take advantage of the organic structures ability to respond to vibratory stimuli and transmit vibrations that are selectively placed therein. By harmonically tapping a specific organ by introducing energy waves, for example in the frequency range of 10,000 to 200,000 cycles per second, additional inaudible sounds are produced in the respective organ. This results in energy waves to be created and transmitted at a different frequency than the frequency of the present ultrasonic energy waves, which latter waves the translator detector equipment may filter out and become audible for the operator or surgeon. For example, the introduction of energy waves into a selected structure of the body, for example, the skull or any bony structure, effects a stimulation of the entire structure and the energy introduced therein will be absorbed and create or set up vibratory wave patterns therein. The probe is capable of weeding out and detecting these secondary vibrations that are set up as a result of the introduction of the energy waves say at 30 kc. The probe and associated instrumentation may have a filter which will filter out the energy waves at 30 kc. and any other miscellaneous vibrations. What will be left remaining is the resultant ultrasonic wave pattern which in turn the probe is capable of receiving and transforming into the form of audible sound for the diagnostician.

Accordingly, this permits due to the dangerous hazard incident to the use of X-rays or gamma rays the ability to explore and measure whether or not there exist internal structural flaws of living organisms by a new and novel technique in which the resultant audible sound transmitted through the probe indicates to the user of the equipment whether or not there are any fractures or other malfunctions, depending on the particular area under examination. Accordingly, we have the introduction of inaudible wave energy, the resultant creation of additional inaudible wave energy at a different frequency and the reading out of audible sound which the trained ear can detect as to whether or not flaws exist. The bony structure of the body is merely by way of example, since the same principle is applicable to all other organs capable of absorbing energy, transmitting same throughout and being able to receive this information as audible sound thereafter.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof wherein like reference numerals refer to like parts throughout the several views and in which:

FIG. 2, is a side elevational view, of an ultrasonic system in accordance with the present invention;

FIG. 3, is a top elevational view of FIG. 1, illustrating the relationship of equipment;

FIG. 7, is a view similar to FIG. 4, showing a blood clot on the inner wall of a vessel.

PREFERRED EMBODIMENTS OF THE INVENTION

Figure 1:
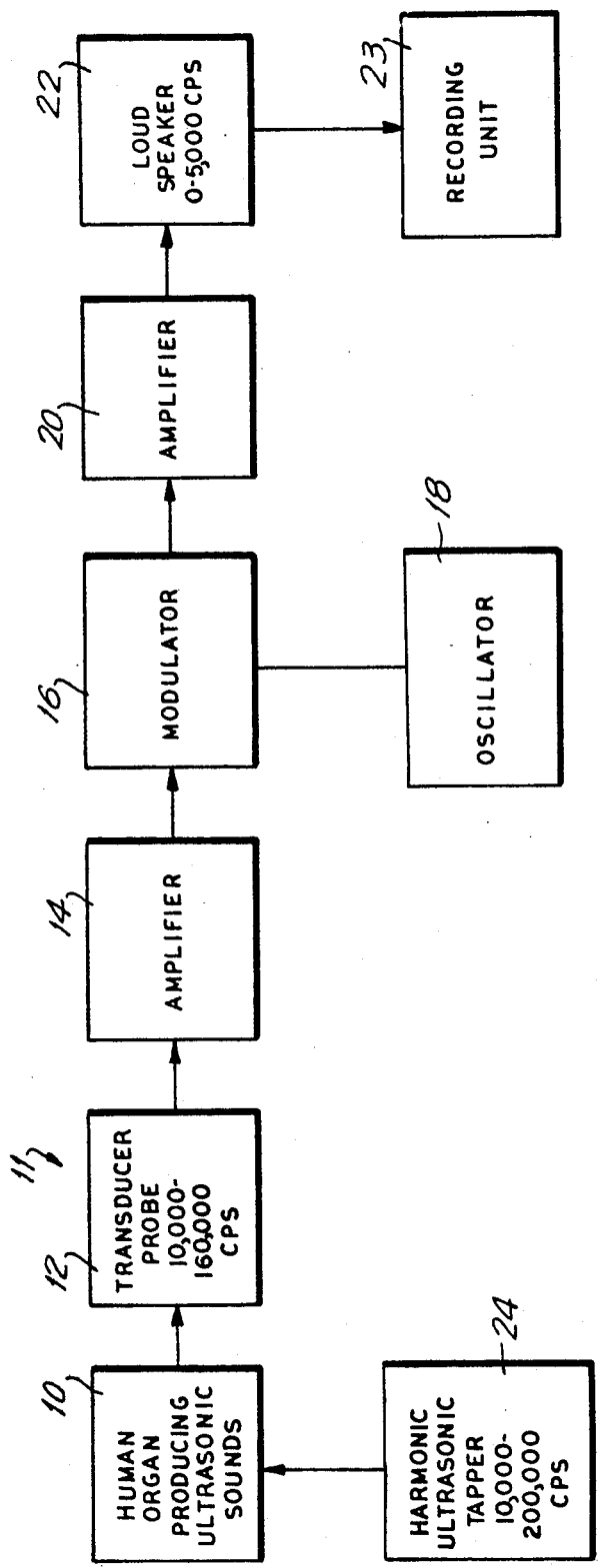
FIG. 1, is a schematic diagram illustrating the various related components of the present invention.

Referring first to FIG. 1, we have a schematic representation of the related components which is adapted to measure the ultrasonic vibrations generated internally by the various organs or systems of the human 10. The instrumentation 11 includes means for receiving ultrasonic energy waves in the form of a transducer probe 12 that is placed in energy transmission relationship to the human 10, and which probe is capable of detecting ultrasonic sounds in the range of 10,000 to 100,000 cycles per second. The detected ultrasonic vibrations are then fed into an amplifier 14 which amplifies the sounds detected by the transducer probe and the amplified sounds are transmitted through modulator 16 that is designed to filter and remove signals outside of a selected frequency band, which may be in the range of 35,000—45,000 cycles per second. The remaining signal is then mixed with a 40,000 cycle oscillator 18 and then transmitted to the amplifier 20 and in turn loudspeaker 22 to produce audible frequencies within the 0—5,000 cycle audible range. These converted ultrasonic signals conveniently exhibit audible sound characteristics that may be diagnosed. Recording means 23 is coupled to the loudspeaker 22 or amplifier 20 to provide a permanent record of the energy wave pattern being emitted by the selected portion of the body under consideration. The recording means 23 may be of a conventional type to either record the audible sound as on a record or tape recorder or a stylus which records the intensity of sound on a chart. By recording the sound a history of a particular person may be developed over the years so that a comparison may be made from time to time by the doctor.

The ultrasonic translator detector instrumentation 11 permits one to hear the silent sounds of various systems and thus analyze their functions and malfunctions immediately. This is done by electronically translating the ultrasonic acoustic energy released by virtually all body systems into audible sound and after a certain degree of expertize the characteristics of the translator sounds are preserved and the nature of the phenomenon is immediately apparent. Certain ultrasonic translator detectors capable of functioning in this capacity are presently available from Hewlett Packard, Delcon Division, for example Model 4916A, 4905A, 4918A, 4917A and others, modified accordingly may be utilized in accordance with the present invention.

In accordance with another aspect of the invention we take advantage of the human's ability to respond to vibratory stimuli and transmit vibrations that are selectively placed therein. Means for transmitting ultrasonic energy waves as by an harmonic tapper 24, capable of producing and transmitting energy waves in the frequency range of 10,000—200,000 cycles per second is placed in energy transmission relation and introduces inaudible sounds in the human 10. This results in energy waves to be created and transmitted at a different frequency than that automatically produced by the body so that an ultrasonic energy pattern is developed. The instrumentation 11 is similarly used as hereinabove explained such that the wave pattern created by the introduced ultrasonic energy waves, and those in existence, if any, for a particular part of the body, may be sensed in the form of audible sound for the diagnostician.

Harmonic tapping is a way of repeatedly striking an object with a constant interval between blows. In this way the object is made to vibrate or "ring," producing vibrations specific to itself. By varying the interval between blows or taps (i.e. same as varying frequency of harmonic tappers) a different "ringing" relationship with the body or object may be obtained and in this way specific information about the "ringing" nature of the object may be produced. Of course, to actually hear the results translator detection is needed.

Referring now to FIGS. 2 and 3, it will be seen that the instrumentation 11 may include support means 25 having a plurality vertical legs 26 and a top 27 on which the human 10 may be supported during the detection of the ultrasonic sounds emitted by the circulatory system 30 of the human.

The integrated operating components of the apparatus 11 may be contained on or associated with positioning means 35 to provide equipment mobility for a variety of positions without necessitating changing of the position of the human 10, and includes a base 36 with a plurality of casters for ease of movement and a vertical leg 38 which extends therefrom for slidable engagement with bracket 39 which has secured thereto shelf 40 in any conventional manner. The bracket 39 is provided with a vertical bore for receiving the vertical leg 38 and has a slot 41 having a bolt 42 extending therethrough to clamp the bracket in fixed position to the vertical leg 38. It is appreciated that other mechanical means to maneuver the instrumentation may be employed.

In operation the user of the equipment 45, who may be a doctor, nurse, etc., first selects the portion of the circulatory, or other system, 30 to be investigated and puts on the headset 46 to produce the audible sound. The headset 46 is connected by wire 48 to the instrumentation 11 contained on shelf 40 and which has an on and off switch 50 with a gain control knob 52 to vary the intensity of the sound. A meter 54 is also provided so that the operator may visually see the intensity sounds being detected. The transducer probe 12 is connected by cable 56 to the amplifier contained on the shelf 40 within the instrumentation 11.

When water flows in a stream or brook the depth and width is constantly varying. Both the volume of water entering any part of the stream must equal the volume leaving a nearby part in the same time, or else there would be a piling up (or a diminishing) of the amount of water between the two parts. But this does not happen for a steady flow. This well-known law of steady flow of liquids requires, therefore, that at a constricted part of the flow the speed of flow must increase in order to supply the necessary flow volume per unit time.

Thus, if one considers the flow of blood in an artery, it is clear that the speed of the blood will vary with the cross section of the interior of said artery. Now, as soon as variations in flow speed occur, there must be acceleration of the blood during such flow speed changes. This is merely an elementary application of Newton's second law of motion, which asserts the necessity for an unbalanced external force when a body is accelerated. For narrower constrictions in the blood flow there will be larger acceleration forces and the combination of artery wall friction and blood viscosity will cause vibrations to occur over a wide spectrum including the ultrasonic ranges. Now, both the volume and the spectrum of vibrations will vary with the changes in artery, (or vein) wall characteristics and with the way in which the cross-sectional area is changing in that region. With the microphone detector of this invention and with translator-detector means, audible sounds may be heard and used diagnostically.

Figure 4:
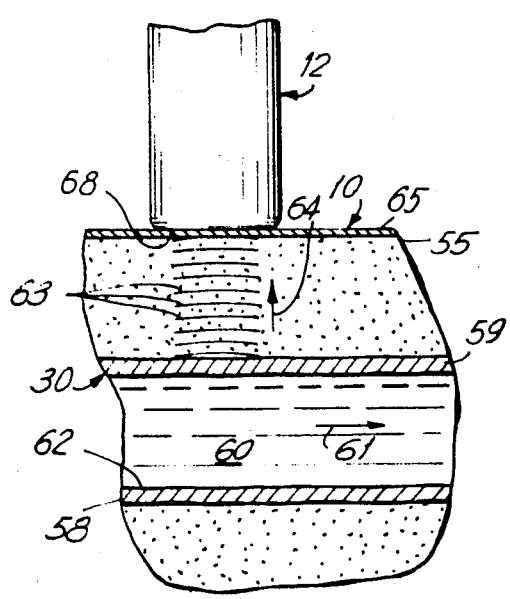
FIG. 4, is a greatly enlarged view of a portion of the organic structure with the instrumentation associated therewith.
Figure 5:
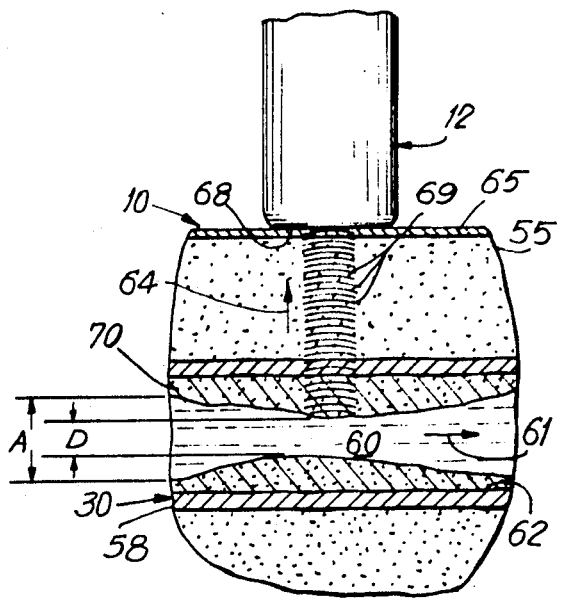
FIG. 5, is a view similar to FIG. 4, illustrating another portion of the organic structure with physical changes thereto.

Referring now to FIGS. 4 and 5, we see an enlarged view of the selected portion 55 of the human 10 having a blood vessel 58 with its wall 59 containing therein blood 60 flowing therethrough in the direction of arrow 61. FIG. 4, illustrates a portion of a circulatory system 30, of either a young person or even an adult in which the inner surface 62 of the wall 59 is substantially free of any buildup of foreign deposits. A blood vessel 58 in this condition will still create ultrasonic sounds as the blood 60 is pumped therethrough, in the direction of arrow 61, such that the energy patterns in the form of waves 63 are transmitted in the direction of arrow 64 to the surface layer of skin 65. The sensing surface 68 of the probe 12 is positioned in energy receiving relation to these propagated energy waves which are in the ultrasonic spectrum and which the instrumentation 11 translates into audible sound to be received by the earphones in headset 46 of the user 45. This sound to the skilled diagnostician after numerous cases will indicate to him that the selected portion 55 of the vascular system from which the sounds are being received is substantially free of foreign deposits and/or hardening of the arteries.

In FIG. 5, in contrast to FIG. 4, we have in a portion of the blood vessel 58 an accumulation of foreign material 70, such as cholesterol, deposited on the inner wall surface 62 such that a change in cross section, or surface contour is obtained. As illustrated we have in a given portion a change in dimension from A, to a constricted area D such that as the blood 60 flows therethrough in the direction of arrow 61, ultrasonic energy waves 69 are emitted in the direction of arrow 64 and that are different than the energy waves 63 in FIG. 4. These energy waves 69 are transmitted by the contacting surface 68 of the probe 12, to the instrumentation 11 in a similar manner as explained above. To the skilled operator 45 with knowledge of the circulatory system 30 these now audible sounds permit the pinpointing of such a restriction or accumulation of material such that it can be determined to what extent the vessel has deteriorated or to what degree the elasticity of the inner wall of the vessel 58 has tended to become rough and ragged which offers opportunities for blood clots to form.

Figure 6:
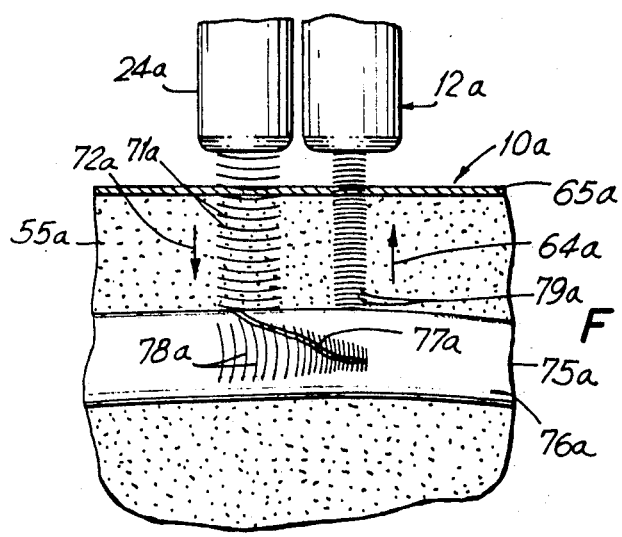
FIG. 6, is a view similar to FIG. 4, of another portion of an organic structure.

FIG. 6, illustrates another embodiment of the invention in which the ultrasonic instrumentation has transmitting means 24a which acts as a harmonic ultrasonic tapper to introduce a first beam of ultrasonic waves 71a into the selected portion 55a of the human 10a in the direction of arrow 77a so that the system 75a receives this first pattern. The portion 55a of the body under consideration in FIG. 6, is the skeletal system 75a in which a bone 76a having a crack 77a therein is under consideration. The introduced ultrasonic waves 71a induce a second pattern of ultrasonic waves 78a to be propagated through the bone 76a such that the probe 12a in spaced apart relation to the introduced waves 70a is capable of detecting the resultant pattern of emitted waves 78a in the direction of arrow 64a and in turn processed through the instrumentation 11a. The crack 77a results in a different wave pattern and in turn audible sound of these secondary vibrations 79a than if the crack was not present therein. These waves 79a travel in the direction of arrow 64a and are received by the receiving means 12a in energy spaced relation to the skin 65a.

Thus by harmonically tapping a specific organ by introducing energy waves, for example in the frequency range of 1,000 to 200,000 cycles per second, additional inaudible sounds are produced in the respective organ which latter waves by the translator detector equipment are filtered out and become audible for the operator or surgeon.

In FIG. 7, we see an enlarged view of the selected portion 55b of the human 10b in which the blood vessel 58b has on the surface 62b of its wall 59b a blood clot 80b, with the blood 60b flowing around it in the direction of arrow 61b. The ultrasonic receiving means 12b is positioned in energy receiving relation to the ultrasonic vibration 69b being emitted in the direction of arrow 64b, as the blood 60b flows past the clot 80b. In this embodiment the probe 12b is inserted within the human 10b either in contact with the blood vessel 58b or in spaced relation thereto. In a similar manner, if energy receiving means is used it may also be inserted into the body.

CONCLUSION

From the above disclosure, it is evident that the method and apparatus of this invention embraces an interrelated series of devices and instruments which can be advantageously employed for effectively detecting the condition of biological structures of humans and other animals in vivo. In accordance with the invention the heretofore silent sounds of the body are detected and translated into audible sound for diagnostic purposes. This invention contemplates a complete automatic unit which would permit a patient to stand before it and obtain a complete flow diagram of the functioning of a particular system. For example a patient would stand before the unit and an automatic tracer would follow the vascular system and pinpoint danger areas for further examination. By having a computerized system annual checkups would be given each patient and the year to year changes recorded and analyzed.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention, except as defined in the appended claims.

I claim:

1. A method for diagnosing the medical condition of a portion of a human in vivo, comprising the steps of:

A. selecting a portion of the human to be diagnosed,

B. positioning in energy transferring relation to the portion selected energy receiving means capable of detecting ultrasonic vibrations emitted therefrom, and C. converting the detected ultrasonic vibrations received by said energy receiving means into sound in the audible range, whereby this audible sound may be diagnosed to determine the condition of the selected portion of the human.

2. A method as in claim 1, further including the step of transmitting ultrasonic vibrations to the selected portion which vibrations are propagated therethrough for detection by the energy receiving means.

3. A method as in claim 1, further including the step of recording the audible sound to have a permanent record thereof.

4. A method as in claim 1, further including the step of moving said energy receiving means relative to the human to continuously diagnose a system thereof.

5. A method as in claim 1, wherein the selected portion emits its own ultrasonic vibrations.

6. A method as in claim 5, wherein the energy receiving means is in contact with the outer surface of the body and in energy transferring relation to the selected portion for detecting the ultrasonic vibrations.

7. A method as in claim 5, wherein the energy receiving means is in spaced relation to the outer surface of the body and in energy transferring relation to the selected portion for detecting the ultrasonic vibrations.

8. A method as in claim 5, wherein the energy receiving means is inserted within the body and in energy transferring relation to the selected portion for detecting the ultrasonic vibrations.

9. A method as in claim 5, wherein the portion of the human is selected from one of the following systems, circulatory, digestive, skeletal, nervous and sensory.

10. A method as in claim 5, wherein the portion of the human diagnosed is in the vascular system to detect the accumulation of deposits in the blood vessels thereof.

11. A method as in claim 5, wherein the portion of the human diagnosed is in the vascular system to detect the change in elasticity of the blood vessels thereof.

12. A method as in claim 5, wherein the portion of the human diagnosed is in the vascular system to detect the existence of blood clots.

13. A method as in claim 5, further including the step of transmitting a beam of ultrasonic vibrations to the selected portion to create a resultant pattern of ultrasonic energy waves created by the ultrasonic vibrations normally emitted by said selected portion and said transmitted vibrations, whereby the audible sound of said resultant pattern may be analyzed.

14. A method for diagnosing the condition of a portion of a human in vivo, comprising the steps of:

A. positioning in energy transferring relation to a portion of the body ultrasonic energy transmitting and receiving means, B. propagating ultrasonic energy between said transmitting and receiving means through said portion, and C. converting the ultrasonic energy received by said receiving means into sound in the audible range to permit a diagnosis of the condition of the portion through which said ultrasonic energy has propagated.

15. A method as in claim 14, a. wherein said portion of the human selected emits a first ultrasonic energy pattern, b. wherein said transmitting means propagates a second ultrasonic energy pattern, and c. wherein both of said patterns are combined and detected by said receiving means and converted into sound in the audible range.

16. A method as in claim 15, further including the step of filtering out ultrasonic energy at the frequency of said second ultrasonic energy pattern, whereby the resultant pattern contains ultrasonic energy at other frequencies.

17. A method as in claim 14, wherein said energy transmitting or receiving means is positioned in contact with the outer surface of the body to obtain said energy transferring relation.

18. A method as in claim 14, wherein said energy transmitting or receiving means is positioned in spaced relation to the outer surface of the body to obtain said energy transferring relation.

19. A method as in claim 14, wherein said energy transmitting or receiving means is inserted within the body to obtain said energy transferring relation.

20. A method as in claim 14, wherein the portion of the human diagnosed is of the skeletal system and the resultant audible sound detects if any flaws exist therein.

21. A method as in claim 14, further including the step of recording the audible sound to have a permanent record thereof.